United States Patent
Lee et al.

(10) Patent No.: US 7,330,360 B2
(45) Date of Patent: Feb. 12, 2008

(54) DRIVING APPARATUS OF DISPLAY DEVICE AND DC-DC CONVERTER

(75) Inventors: Sang-Gil Lee, Seoul (KR); Don-Chan Cho, Gyeonggi-do (KR); Jong-Seo Lee, Gyeonggi-do (KR); Gi-Cherl Kim, Gyeonggi-do (KR); Sang-Yu Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/212,002

(22) Filed: Aug. 24, 2005

(65) Prior Publication Data
US 2006/0181904 A1 Aug. 17, 2006

(30) Foreign Application Priority Data
Feb. 16, 2005 (KR) .............. 10-2005-0012690

(51) Int. Cl.
*H02M 3/335* (2006.01)
(52) U.S. Cl. ............... 363/21.12; 363/21.16; 363/21.18
(58) Field of Classification Search ... 363/21.12–21.18
See application file for complete search history.

(56) References Cited

U.S. PATENT DOCUMENTS

| | | | |
|---|---|---|---|
| 5,119,013 A | | 6/1992 | Sabroff |
| 5,872,705 A | * | 2/1999 | Loftus et al. ............ 363/21.06 |
| 6,011,703 A | * | 1/2000 | Boylan et al. ........... 363/21.06 |
| RE36,571 E | * | 2/2000 | Rozman .................. 363/21.06 |
| 6,104,623 A | * | 8/2000 | Rozman .................. 363/21.06 |
| 6,222,352 B1 | | 4/2001 | Lenk |
| RE37,889 E | * | 10/2002 | Rozman .................. 363/21.06 |
| 6,606,257 B2 | * | 8/2003 | Bourdillon .............. 363/21.12 |
| 6,650,095 B2 | | 11/2003 | Aiello et al. |
| 6,999,325 B2 | * | 2/2006 | Zverev et al. ........... 363/21.12 |

FOREIGN PATENT DOCUMENTS

| | | |
|---|---|---|
| JP | 07-264853 | 10/1995 |
| JP | 11-046479 | 2/1999 |
| JP | 2001-008442 | 1/2001 |
| KR | 1020000074998 | 12/2000 |
| KR | 2002-0074177 | 9/2002 |
| KR | 1020040012220 | 2/2004 |
| KR | 1020040054088 | 6/2004 |
| KR | 1020040066293 | 7/2004 |

OTHER PUBLICATIONS

English Language Abstract, JP Patent First Publication No. 2001-008442, Jan. 12, 2001, 1 page.
English Language Abstract, KR Patent First Publication No. 1020040054088, Jun. 25, 2004, 1 page.

(Continued)

*Primary Examiner*—Bao Q. Vu
(74) *Attorney, Agent, or Firm*—MacPherson Kwok Chen & Heid LLP

(57) ABSTRACT

A DC-DC converter is provided, which includes a transformer including a primary coil and a secondary coil, a boost converter connected to the primary coil of the transformer and generating a first voltage, and a flyback converter connected to the secondary coil of the transformer and generating a second voltage.

19 Claims, 7 Drawing Sheets

OTHER PUBLICATIONS

English Language Abstract, KR Patent First Publication No. 1020040066293, Jul. 27, 2004, 1 page.

English Language Abstract, KR Patent First Publication No. 1020040012220, Feb. 11, 2004, 1 page.

English Language Abstract, WO Patent First Publication No. 0235692, May 2, 2002, 1 page (counterpart to Korean Publication No. 2002-0074177).

English Language Abstract, KR Patent First Publication No. 1020000074998, Dec. 15, 2000, 1 page.

English Language Abstract, JP Patent First Publication No. 11-046479, Feb. 16, 1999, 1 page.

English Language Abstract, JP Patent First Publication No. 07-264853, Oct. 13, 1995, 1 page.

* cited by examiner

DRIVING APPARATUS OF DISPLAY DEVICE AND DC-DC CONVERTER

BACKGROUND OF THE INVENTION (a) Field of the Invention

The present invention relates to a driving apparatus of a display device and a DC-DC converter.

(b) Description of the Related Art

Display devices used for monitors for computers and television sets include self-emitting displays such as light emitting diodes (LEDs), electroluminescence (EL) devices, vacuum fluorescent displays (VFDs), field emission displays (FEDs), and plasma panel displays (PDPs), and non-emitting displays such as liquid crystal displays (LCDs) requiring an external light source.

An LCD includes two panels provided with field-generating electrodes and a liquid crystal (LC) layer with dielectric anisotropy interposed therebetween. The field-generating electrodes are supplied with electric voltages and generate an electric field in the liquid crystal layer, and the transmittance of light passing through the panels varies depending on the strength of the applied field, which can be controlled by the applied voltages. Accordingly, desired images are obtained by adjusting the applied voltages.

The light may be emitted from a light source equipped in the LCD, or it may be natural light.

A lighting device for an LCD, i.e., a backlight unit, usually includes a plurality of fluorescent lamps such as external electrode fluorescent lamps (EEFLs) and cold cathode fluorescent lamps (CCFLs), or a plurality of light emitting diodes (LEDs), as light sources, which uniformly transmit the light to the entire front surface of the LC panels from the rear thereof.

When using the fluorescent lamps, characteristics of elements of the display device are deteriorated due to large power consumption and heating.

In addition, the fluorescent lamps have a stick shape, so they can easily break on impact. Moreover, since temperatures of the lamps vary in accordance with positions thereof, the luminance of the lamps also varies, the image quality of the LCD thereby decreases.

However, when LEDs are used, since each LED is a semiconductor device, the lifetime of the LED is long, the lighting speed of the LED is fast, and the power consumption is low. The LED also withstands impacts well and miniaturization thereof is easy.

Because of these benefits, LEDs have been equipped in monitors for middle or large sized LCDs such as for computers or television sets, as well as in small sized LCDs such as in mobile telephones, as a light source.

The LCD requires various DC (direct current) voltages for driving the LEDs, a cooling fan for cooling the LCD, and a plurality of microcomputers. Thus, the LCD includes a DC-DC converter that converts an AC (alternate current) voltage into a DC voltage and adjusts the voltage level of the DC voltage.

For obtaining a plurality of DC voltages, the LCD may include a plurality of DC-DC converters that generate DC voltages with the desired voltage levels, respectively, or may include a DC-DC converter having a transformer with a plurality of wound wire portions.

However, when multiple DC-DC converters are used, the volume and weight of the LCD are increased and the manufacturing cost is also increased. When a DC-DC converter having a transformer with a plurality of wound wire portions is used, the driving loss of the transformer is increased causing decrease in the efficiency of the DC-DC converter. Also because of the wound wire portions, the volume and weight of the LCD are increased.

SUMMARY OF THE INVENTION

A motivation of the present invention is to solve the problems of conventional techniques.

In an embodiment of the preset invention, a DC-DC converter is provided, which includes a transformer including a primary coil and a secondary coil, a boost converter connected to the primary coil of the transformer and generating a first voltage, and a flyback converter connected to the secondary coil of the transformer and generating a second voltage.

The boost converter may include a first switching element connected to the primary coil of the transformer, a second switching element connected to the first switching element, and a capacitor connected to the first and second switching elements.

The first switching element may be an MOSFT (metal oxide silicon field effect transistor), and the second switching element may be a diode or a synchronous rectifier.

The flyback converter may include a diode connected to the secondary coil of the transformer, a switching element connected to the diode, and a capacitor connected to the diode and the secondary coil. The switching element may be a synchronous rectifier.

In a further embodiment of the present invention, a driving apparatus is provided, which includes a transformer including a primary coil and a secondary coil, a boost converter connected to the primary coil of the transformer and generating a first voltage, a flyback converter connected to the secondary coil of the transformer and generating a second voltage, a first load supplied to the first voltage, and a second load supplied to the second voltage.

The boost converter may include a first switching element connected to the primary coil of the transformer, a second switching element connected to the first switching element, and a capacitor connected to the first and second switching elements. The first switching element may be an MOSFET. The second switching element may be a diode or a synchronous rectifier.

The flyback converter may include a diode connected to the secondary coil of the transformer, a switching element connected to the diode, and a capacitor connected to the diode and the secondary coil. The switching element may be a synchronous rectifier.

In a still further embodiment of the present invention, a driving apparatus for a display device including a plurality of pixels is provided, which includes a voltage generator generating first and second voltages, a first load supplied with the first voltage from the voltage generator, and a second load supplied with the second voltage from the voltage generator. The voltage generator includes a transformer including a primary coil and a secondary coil, a first voltage generator connected to the primary coil of the transformer and generating the first voltage, and a second voltage generator connected to the secondary coil of the transformer and generating the second voltage.

The first voltage generator may be a boost converter, and it may include a first switching element connected to the primary coil of the transformer, a second switching element connected to the first switching element, and a capacitor connected to the first and second switching elements. The second voltage generator may be a flyback converter. The second converter may include a diode connected to the secondary coil of the transformer, a switching element connected to the diode, and a capacitor connected to the diode and the secondary coil. The first load may be a cooling fan, and the second load may be a microcomputer.

In a still further embodiment of the present invention, a DC-DC converter is provided, which includes a transformer including a primary coil and a secondary coil, a boost converter connected to the primary coil of the transformer and generating a first voltage, and a flyback converter connected to the secondary coil of the transformer and generating a second voltage.

BRIEF DESCRIPTION OF THE DRAWINGS

The present invention will become more apparent by describing embodiments thereof in detail with reference to the accompanying drawings, in which.

DETAILED DESCRIPTION OF EMBODIMENTS

Figure 1:
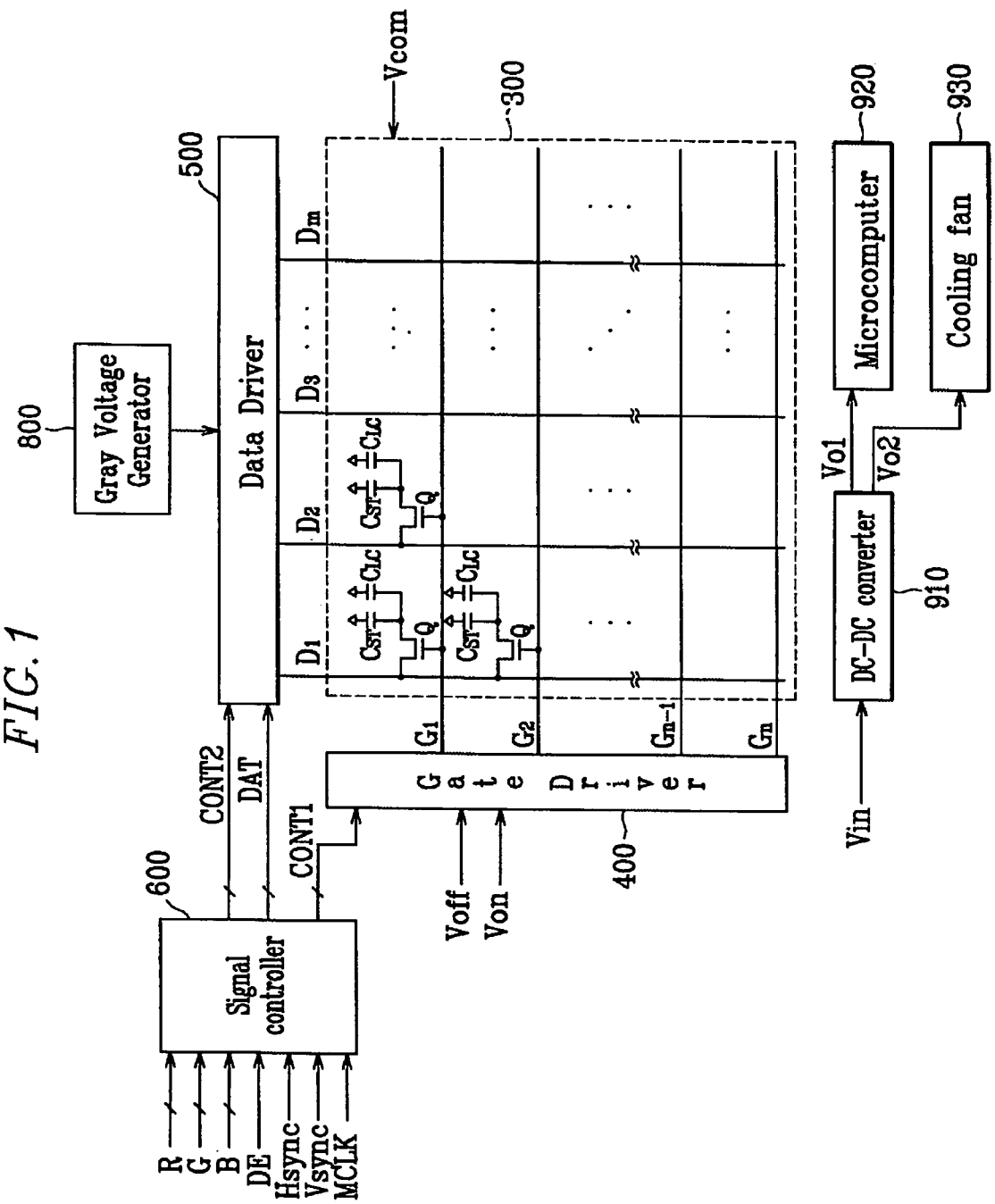
FIG. 1 is a block diagram of an LCD according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region, or substrate is referred to as being "on" another element, it can be directly on the other element or intervening elements may also be present. In contrast, when an element is referred to as being "directly on" another element, there are no intervening elements present.

A driving apparatus of a display device and a DC-DC converter according to embodiments of the present invention will be described with reference to the accompanying drawings.

Figure 2:
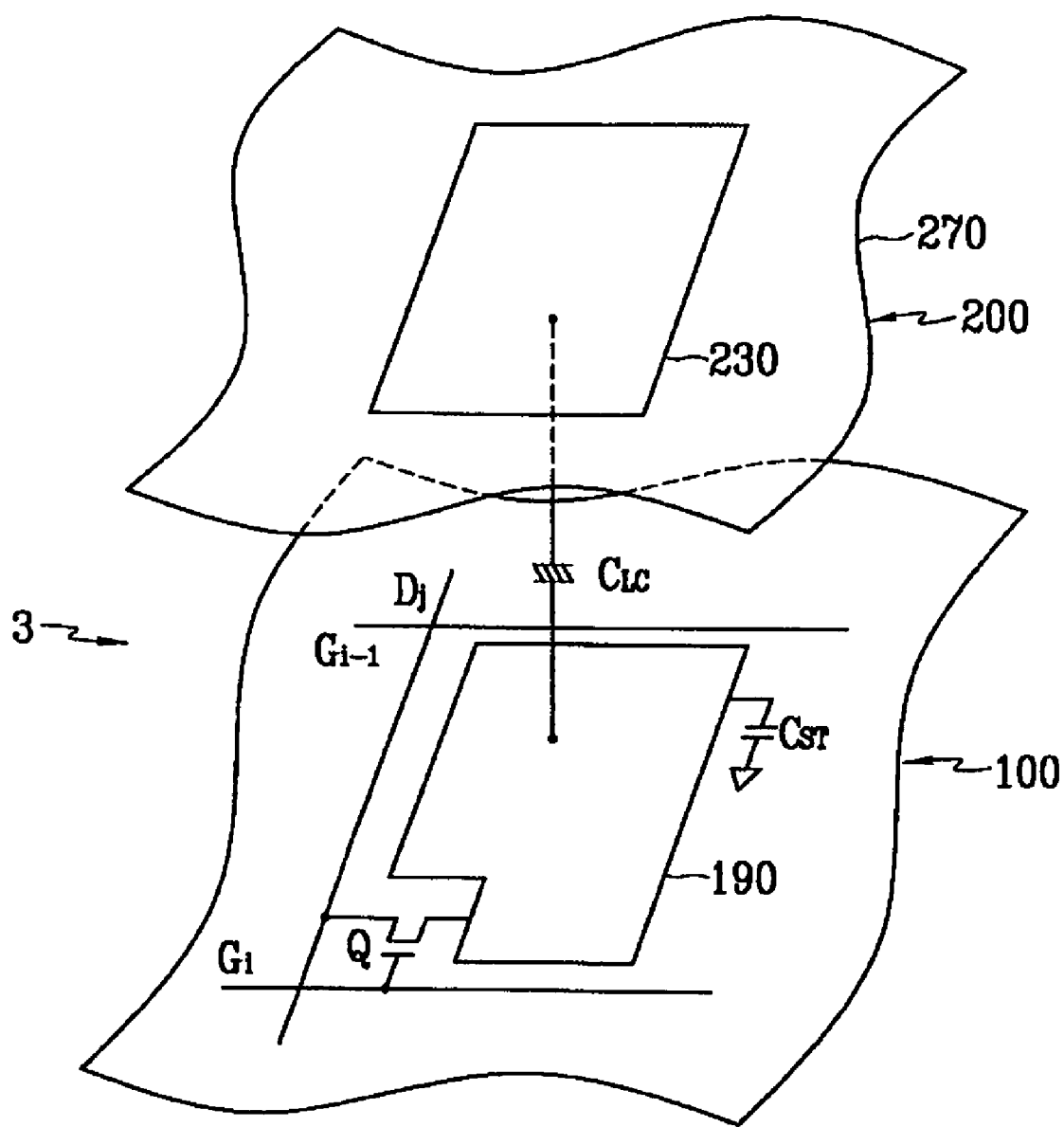
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment of the present invention includes an LC panel assembly 300, and a gate driver 400 and a data driver 500 connected thereto, a gray voltage generator 800 connected to the data driver 500, a DC-DC converter 910, a cooling fan 930 connected to the DC-DC converter 910, and a signal controller 600 controlling the above-described elements.

The LC panel assembly 300 includes a lower panel 100, an upper panel 200, and a liquid crystal layer 3 interposed therebetween, while it includes a plurality of display signal lines G1-Gn and D1-Dm and a plurality of pixels connected thereto and arranged substantially in a matrix in the circuital views shown in FIGS. 1 and 2.

The display signal lines G1-Gn and D1-Dm are provided on the lower panel 100 and include a plurality of gate lines G1-Gn transmitting gate signals (called scanning signals) and a plurality of data lines D1-Dm transmitting data signals. The gate lines G1-Gn extend substantially in a row direction and are substantially parallel to each other, while the data lines D1-Dm extend substantially in a column direction and are substantially parallel to each other.

Each pixel includes a switching element Q connected to the display signal lines G1-Gn and D1-Dm, and an LC capacitor $C_{LC}$ and a storage capacitor $C_{ST}$ that are connected to the switching element Q. The storage capacitor $C_{ST}$ may be omitted if it is unnecessary.

The switching element Q such as a TFT is provided on the lower panel 100 and has three terminals: a control terminal connected to one of the gate lines G1-Gn; an input terminal connected to one of the data lines D1-Dm; and an output terminal connected to the LC capacitor $C_{LC}$ and the storage capacitor $C_{ST}$.

The LC capacitor $C_{LC}$ includes a pixel electrode 190 on the lower panel 100, a common electrode 270 on the upper panel 200, and the LC layer 3 as a dielectric between the electrodes 190 and 270. The pixel electrode 190 is connected to the switching element Q, and the common electrode 270 covers the entire surface of the upper panel 200 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, it overlaps the pixel electrode 190 via an insulator, and it is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

Figure 3:
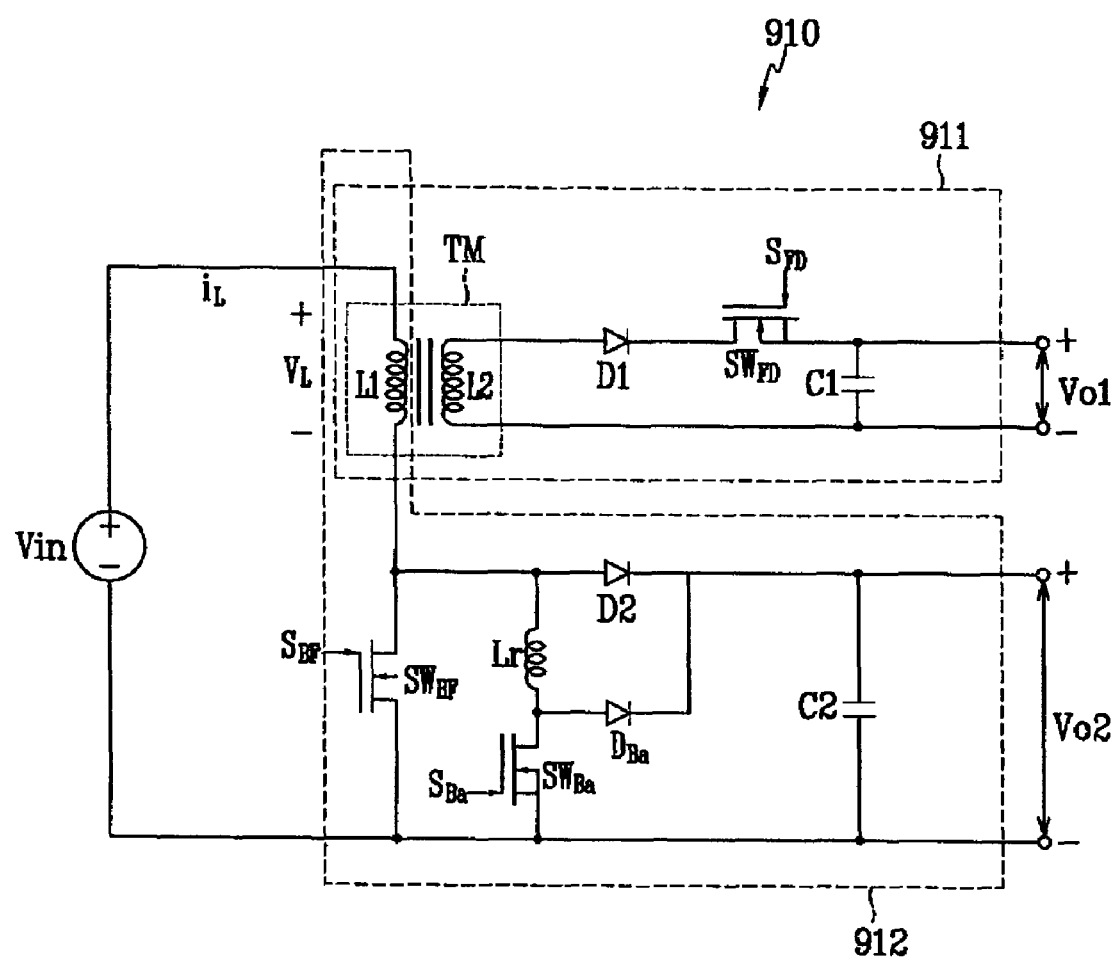
FIG. 3 is a circuit diagram of a DC-DC converter shown in FIG. 1.

For color display, each pixel uniquely represents one of primary colors (i.e., spatial division) or each pixel sequentially represents the primary colors in turn (i.e., temporal division) such that a spatial or temporal sum of the primary colors is recognized as a desired color. An example of a set of the primary colors includes red, green, and blue colors. FIG. 3 shows an example of the spatial division in which each pixel includes a color filter 230 representing one of the primary colors in an area of the upper panel 200 facing the pixel electrode 190. Alternatively, the color filter 230 is provided on or under the pixel electrode 190 on the lower panel 100.

A pair of polarizers (not shown) polarizing the light is attached on the outer surfaces of the panels 100 and 200 of the panel assembly 300.

The gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines G1-Gn of the panel assembly 300 and synthesizes the gate-on voltage Von and the gate off voltage Voff to generate gate signals for application to the gate lines G1-Gn. The gate driver 400 may include a plurality of integrated circuits.

The data driver 500 is connected to the data lines D1-Dm of the panel assembly 300 and applies data voltages selected from the gray voltages supplied from the gray voltage generator 800 to the data lines D1-Dm. The data driver 500 may include a plurality of integrated circuits.

The gate driving circuits of the gate driver 400 or the data driving circuit of the data driver 500 may be implemented as integrated circuit (IC) chips mounted on the panel assembly 300 or on a flexible printed circuit (FPC) film in a tape carrier package (TCP), which is attached to the LC panel assembly 300. Alternately, the drivers 400 and 500 may be integrated into the panel assembly 300 along with the display signal lines $G_1$-$G_n$ and $D_1$-$D_m$ and the TFT switching elements Q The DC-DC converter 910 converts an externally applied DC voltage Vin to generate a plurality of voltages with the desired voltage levels. For example, two voltages Vo1 and Vo2 can be generated by converter 910. The DC-DC converter 910 may be mounted on an inverter PCB (not shown) for driving a light source (not shown).

The microcomputer 920 is driven by the DC voltage Vo1 applied from the DC-DC converter 910.

The cooling fan 930 is driven by the DC voltage Vo2 applied from the DC-DC converter 910 to discharge heat generated in the LCD from the light source to outside of the LCD. The cooling fan 930 may be mounded on a lower chassis (not shown) of the LCD.

The signal controller 600 controls the drivers 400 and 500.

Now, the operation of the LCD will be described in detail.

The signal controller 600 is supplied with RGB image signals R, G, and B and input control signals controlling the display thereof such as a vertical synchronization signal Vsync, a horizontal synchronization signal Hsync, a main clock MCLK, and a data enable signal DE, from an external graphic controller (not shown). After generating gate control signals CONT1 and data control signals CONT2 and processing the image signals R, G, and B to be suitable for the operation of the panel assembly 300 on the basis of the input control signals, the signal controller 600 provides the gate control signals CONT1 to the gate driver 400, and the processed image signals DAT and the data control signals CONT2 to the data driver 500.

The gate control signals CONT1 include a scanning start signal STV for instructing to start scanning and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of pixels, a load signal LOAD for instructing the data driver 500 to apply the data voltages to the data lines D1-Dm, and a data clock signal HCLK. The data control signal CONT2 may further include an inversion signal RVS for reversing the polarity of the data voltages (with respect to the common voltage Vcom).

In response to the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines D1-Dm.

The gate driver 400 applies the gate-on voltage Von to the gate line G1-Gn in response to the gate control signals CONT1 from the signal controller 600, thereby turning on the switching elements Q connected thereto. The data voltages applied to the data lines D1-Dm are supplied to the pixels through the activated switching elements Q.

The difference between the data voltage and the common voltage Vcom is represented as a voltage across the LC capacitor $C_{LC}$, which is referred to as a pixel voltage. The LC molecules in the LC capacitor $C_{LC}$ have orientations depending on the magnitude of the pixel voltage, and the molecular orientations determine the polarization of light passing through the LC layer 3 The polarizer(s) converts the light polarization into light transmittance.

By repeating this procedure by a unit of the horizontal period, all gate lines G1-Gn are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion"). The inversion control signal RVS may also be controlled such that the polarity of the data voltages flowing in a data line in one frame is reversed (for example, line inversion and dot inversion), or the polarity of the data voltages in one packet is reversed (for example, column inversion and dot inversion).

The DC-DC converter 910 generates and outputs a plurality of DC voltages Vo1 and Vo2 with different voltage levels using an applied DC voltage Vin. The operation of the DC-DC converter 910 will be described in more detail below.

The microcomputer 920 is driven by the application of the DC voltage Vo1 from the DC-DC converter 910, to control externally applied signals or apply control signals or data to the signal controller 600 through separate control routines.

The cooling fan 930 is driven by application of the DC voltage Vo2 from the DC-DC converter 910, to discharge heat due to the operation of the LCD to outside of the LCD.

Now, the DC-DC converter 910 according to an embodiment of the present invention will be described in detail with reference to FIGS. 3 to 5H.

Figure 4:
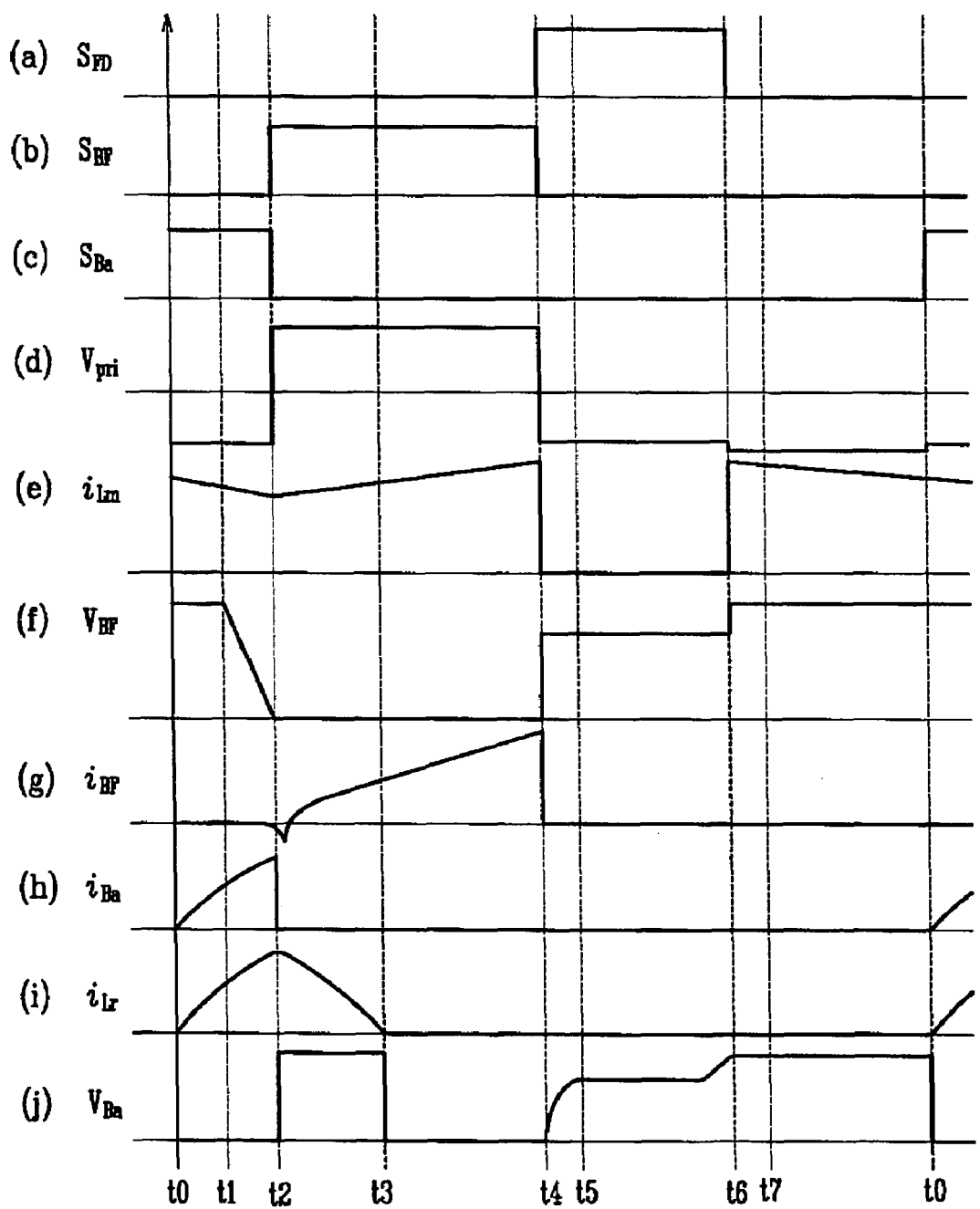
FIG. 4 illustrates waveforms detected at respective points of the DC-DC converter shown in FIG. 3.

FIG. 3 is a circuit diagram of a DC-DC converter shown in FIG. 2, and FIG. 4 illustrates waveforms detected at respective points of the DC-DC converter shown in FIG. 2. FIGS. 5A to 5H are equivalent circuits of the DC-DC converter shown in FIG. 3 and illustrate current flows in respective operating modes.

As shown in FIG. 3, the DC-DC converter 910 includes a transformer TM supplied with a DC input voltage Vin, a diode D1 connected in a forward direction to the transformer, a switching element $SW_{FD}$ of which an input terminal is connected to the diode D1, a capacitor C1 connected in parallel between an output terminal of the switching element $SW_{FD}$ and the transformer TM, a switching element $SW_{BF}$ of which an input terminal and an output terminal are connected to the transformer TM and the input voltage Vin, respectively, a diode D2 connected in the forward direction to the input terminal of the switching element $SW_{BF}$, a capacitor C2 connected in parallel between the diode D2 and the input voltage Vin, an inductor Lr connected to an anode terminal of the diode D2, a switching element $SW_{Ba}$ connected to the inductor Lr and the input voltage Vin, and a diode $D_{Ba}$ of which an anode terminal is connected between the inductor Lr and the switching element $SW_{Ba}$ and a cathode terminal is connected to a cathode terminal of the diode D2.

The transformer TM includes a primary coil L1 connected in series between the input voltage Vin and the input terminal of the switching element $SW_{BF}$ and a secondary coil L2 of which one terminal is connected to the diode D1 and another terminal is connected to the capacitor C1.

The switching elements $SW_{BF}$ and $SW_{Ba}$ are MOSFETs (metal oxide silicon field effect transistors) and the switching element $SW_{FD}$ is a synchronous rectifier. In addition, the diode D2 may be a synchronous rectifier.

Signals $S_{FD}$, $S_{BF}$, and $S_{Ba}$ respectively applied to the input terminals of the switching elements $SW_{FD}$, $SW_{BF}$, and $SW_{Ba}$ are signals with predetermined widths, for example, PWM (pulse width modulation) signals, and may be applied from a separate PWM generator (not shown).

In FIG. 3, the switching element $SW_{FD}$, the transformer TM, the diode D1, and the capacitor C1 form a flyback converter 911, and the switching elements $SW_{BF}$ and $SW_{Ba}$, the primary coil L1 of the transformer TM, the diode $D_{Ba}$, the capacitor C2, and the inductor Lr form a boost converter 912. The flyback converter 911 and the boost converter 912 are in turn operated based on the operating state of the switching elements $SW_{FD}$ and $SW_{BF}$, and the output voltages Vo1 and Vo2 outputted from both terminals of the respective capacitors C1 and C2 have different magnitude. For example, when the input voltage Vin is about 6V, the output voltage Vo1 of the flyback converter 911 is about 5V and the output voltage Vo2 of the boost converter 912 is about 12V. In an embodiment of the present invention, the output voltage Vo1 is applied to the microcomputer 920 as a driving voltage and the output voltage Vo2 is applied to the cooling fan 930 as a driving voltage.

The operations of the DC-DC converter 910 according to an embodiment of the present invention will now be described in detail with reference to FIGS. 4 and 5A to 5H.

In an embodiment of the present invention, a turn ratio n of the primary coil L1 and the secondary coil L2 of the transformer TM is 1. As shown in the equivalent circuits of FIGS. 5A to 5H, a diode Ds and a capacitor Cp represent a parasitic diode and a parasitic capacitor, respectively, associated with the switching element $SW_{BF}$. The resistors R1 and R2 are loads connected to output terminals of the flyback converter 911 and the boost converter 912 and are supplied with the output voltages Vo1 and Vo2, respectively. In embodiments of the present invention, the loads are designated as the microcomputer 920 and the cooling fan 930, respectively. As described above, the signals $S_{FD}$, $S_{BF}$, and $S_{Ba}$ applied to the input terminals of the switching elements $SW_{FD}$, $SW_{BF}$, and $SW_{Ba}$ have a low level or a high level, respectively, and the maintaining periods of the high level are different from each other. That is, these switching elements $SW_{FD}$, $SW_{BF}$, and $SW_{Ba}$ are not turned on simultaneously.

The DC-DC converter 910 has a total of 8 modes for an operating period according to an embodiment of the present invention.

Mode 1 (t0-t1)

Figure 5A:
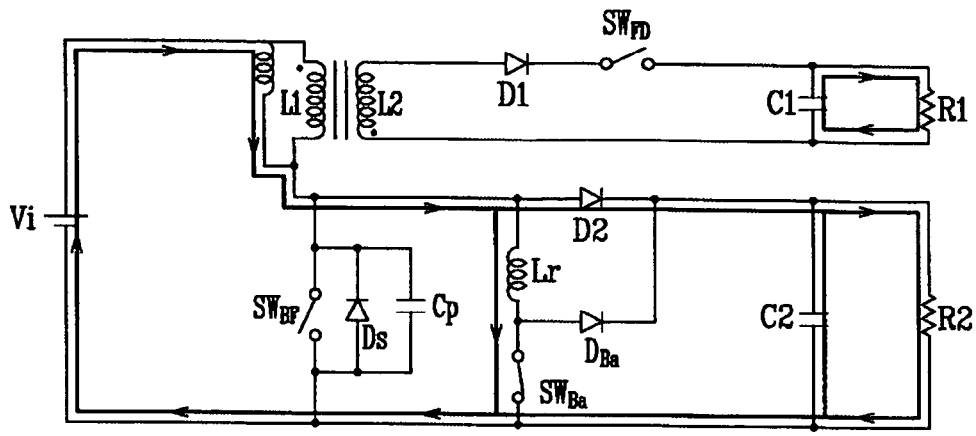
FIGS. 5A to 5H are equivalent circuits of the DC-DC converter shown in FIG. 3 and illustrate current flows in respective operating modes.
Figure 5B:
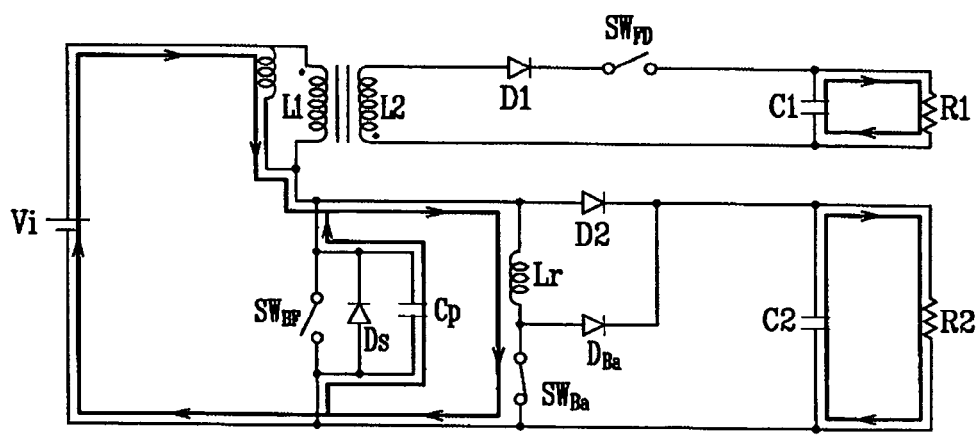

Before the time t0, the switching elements $SW_{FD}$, $SW_{BF}$, and $SW_{Ba}$ are respectively supplied with a control signal with a low state, to cause the switching elements $SW_{FD}$, $SW_{BF}$, and $SW_{Ba}$ to turn off. Thus, the transformer TM charges energy by a current corresponding to an input voltage Vi (which is the same as input voltage Vin in FIG. 3) at the primary coil L1 thereof. At the time t0 (refer to FIG. 5A), the signal $S_{Ba}$ applied to the switching element $SW_{Ba}$ is changed from the low level into a high level, to turn on the switching element $SW_{Ba}$. Thus, a current starts to flow through the inductor Lr, an oscillator inductor. A current $i_{Ba}$ flowing through the switching element $SW_{Ba}$ and a current $i_{Lr}$ flowing through the inductor Lr are gradually and linearly increased (refer to curves (h) and (i) of FIG. 4). In addition, since a voltage $V_L$ applied to both end terminals of the primary coil L1 is higher than a target voltage of the boost converter 912, for example, about 12V, the diode D2 is turned on, and thereby a current starts to flow through the load R2. Meanwhile, charges stored in the output capacitor C1 of the flyback converter 911 are discharged through the output terminal, and thereby, as shown in FIG. 5A, a closed loop is formed and a current flows through the load R1.

At this time, the switching element $SW_{BF}$ is turned off, and a current $i_{BF}$ flowing through the switching element $SW_{BF}$ is in a zero current state (refer to curve (g) in FIG. 4). Since the current starts to flow through the inductor Lr and the switching element $SW_{Ba}$, a current $i_{Lm}$ flowing through the primary coil L1 is gradually decreased (refer to curve (e) in FIG. 4), and a voltage applied across the switching element $SW_{Ba}$ is in a zero voltage state (refer to curve (j) in FIG. 4).

Mode 2 (t1-t2)

At the time t1 (refer to FIG. 5B), the inductor Lr oscillates along with the parasitic capacitor Cp, to start the discharging of charges stored in the capacitor Cp. At this time, the capacitor Cp continues to discharge until the voltage across the capacitor Cp becomes a zero voltage. The currents $i_{BF}$ and $i_{Ba}$ flowing through the switching element $SW_{Ba}$ and the inductor Lr, are respectively increased (refer to curves (h) and (i) in FIG. 4). At the time t1, a magnitude of the current $i_{Lr}$ is equal to that of the current flowing through the primary coil L1 of the transformer TM, and thereby a state of the diode D2 is changed from a turn-on state into a turn-off state. Thus, the current flowing through the diode D2 becomes 0, that is, the zero current state.

As a result, the charges stored in the capacitor C1 are still discharged through the output terminals of the flyback converter 911, to maintain the current flowing through the load R1, and the charges stored in the capacitor C2 are discharged through the output terminals of the boost converter 912, to maintain the current flowing through the load R2.

At this time, since the switching element $SW_{BF}$ is turned off, the current flowing through the switching element $SW_{BF}$ still maintains the zero current state (refer to curve (g) in FIG. 4), the current $i_{Lm}$ flowing through the primary coil L1 of the transformer TM still maintains the decrementing state (refer to curve (e) in FIG. 4), and the voltage $V_{Ba}$ applied across the switching element $SW_{Ba}$ is the zero voltage (refer to curve (j) in FIG. 4).

Mode 3 (t2-t3)

Figure 5C:
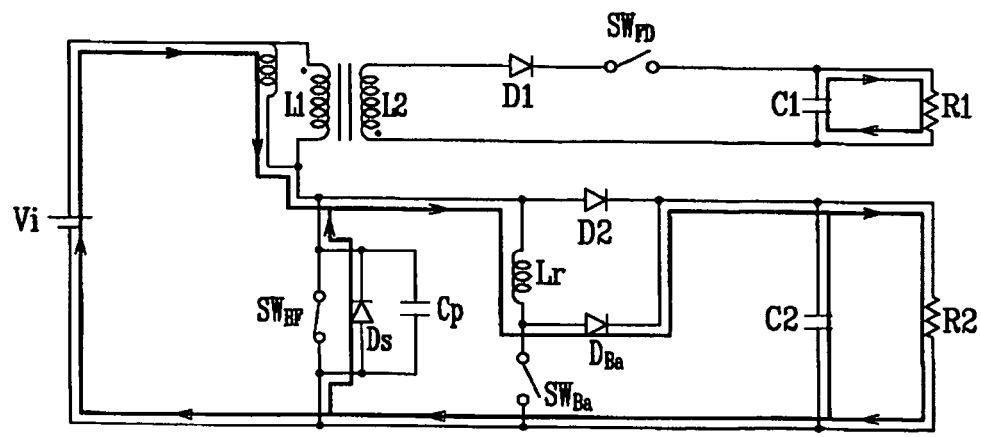

At the time t2, the state of the signal $S_{BF}$ applied to the switching element $SW_{BF}$ is changed from the low level into the high level, and thereby the switching element $S_{BF}$ is turned on (refer to FIG. 5C). In addition, the state of the signal $S_{Ba}$ applied to the switching element $SW_{Ba}$ is changed from the high level into the low level, and thereby the switching element $S_{Ba}$ is turned off. At this time, the current $i_{Lr}$ has increased by a predetermined magnitude to turn on the diode $D_{Ba}$, and thereby the current flowing via the primary coil L1 of the transformer TM flows through the load R2 through the turned on diode $D_{Ba}$. At this time, the charging of the capacitor C2 is started. As a result, by the turning-off of the switching element $SW_{Ba}$, the voltage $V_{Ba}$ applied across the switching element $SW_{Ba}$ is clamped by the diode $D_{Ba}$ to be applied to the load R2 (refer to curve (j) in FIG. 4), and the energy stored in the inductor Lr is transmitted to the load R2 and thereby the current $i_{Lr}$ gradually decreases (refer to curve (i) in FIG. 4).

As a result, the load R2, that is, cooling fan 930 connected to the output terminals of the boost converter 912 is driven. In addition, the current flowing through the load R2 is applied to the tuned-on switching element $SW_{BF}$ and the parasitic capacitor Cp. Thus, the diode Ds is turned on. At the time t2, the switching element $SW_{BF}$ is turned on and thereby the voltage across the switching element $SW_{BF}$ becomes the zero voltage state, and as shown by curve (h) in FIG. 4, the switching element $SW_{Ba}$ is turned off and thereby the current $i_{Ba}$ flowing through the switching element $SW_{Ba}$ becomes 0.

Thus, since the current $i_{BF}$ flows through the inductor Lr via the turned-on switching element $SW_{BF}$, the current $i_{BF}$ flows in a negative (−) direction.

Mode 4 (t3-t4)

Figure 5D:
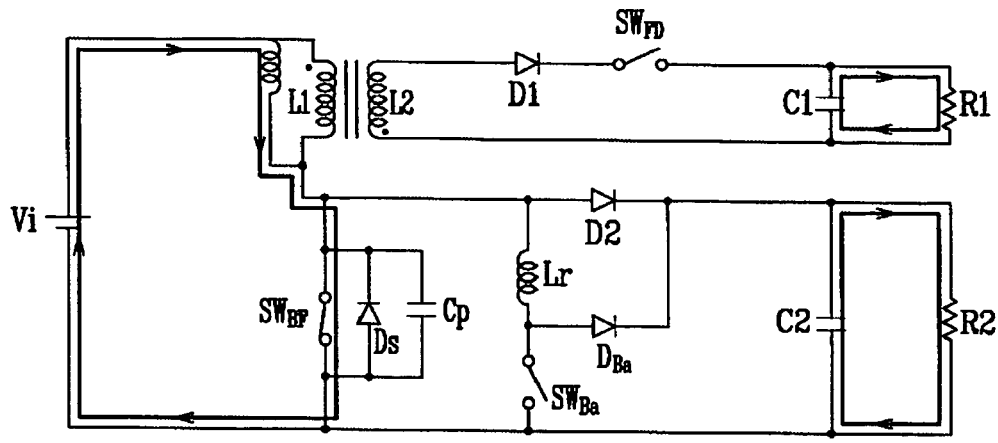

At the time t3 (refer to FIG. 5D), since all of the energy stored in the inductor Lr is exhausted, as shown by curve (i) in FIG. 4, the current $i_{Lr}$ becomes 0 and the diode $D_{Ba}$ is turned off. Thus, the current flowing through the primary coil L1 of the transformer TM flows through the switching element $SW_{BF}$, to form the closed loop, as shown in FIG. 5D. At this time, since the primary coil L1 of the transformer TM functions as an energy charging element, the current $i_{Lm}$ flowing through the primary coil L1 is continuously increased (refer to curve (e) in FIG. 4). Thus, since no currents flow through the flyback converter 911 and the boost converter 912, the charges respectively stored in the capacitors C1 and C2 are discharged through the loads R1 and R2.

Mode 5 (t4-t5)

Figure 5E:
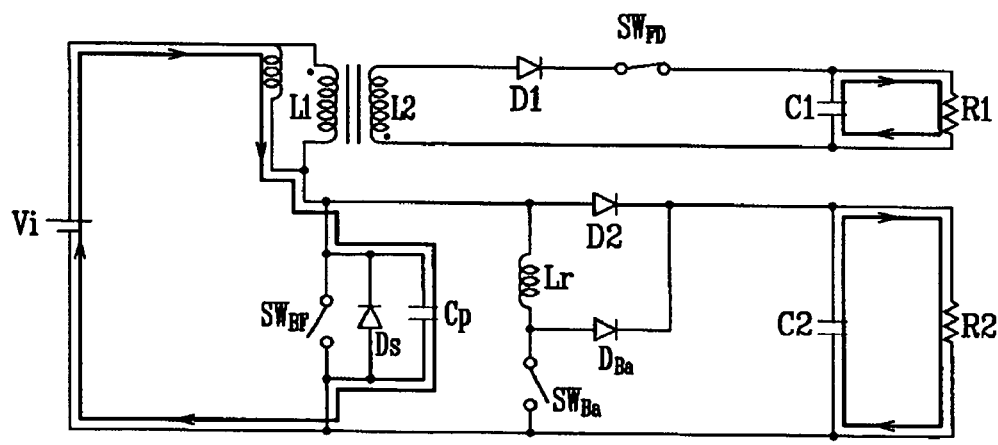
Figure 5F:
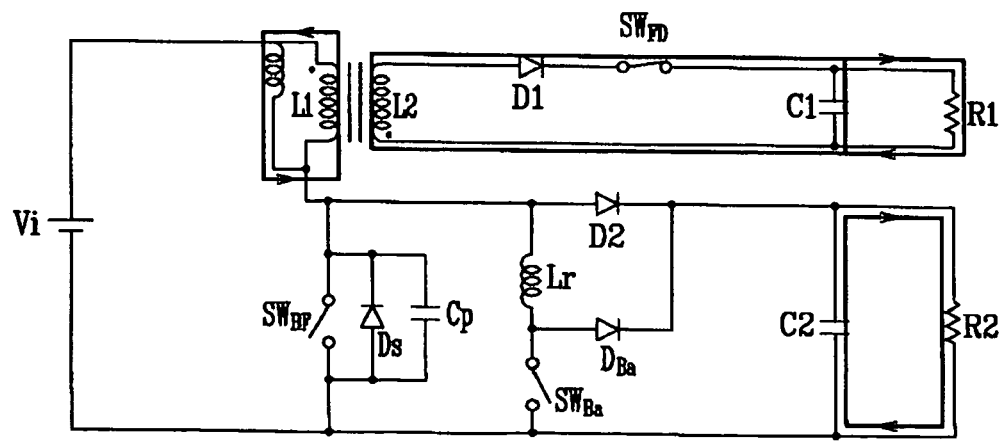
Figure 5G:
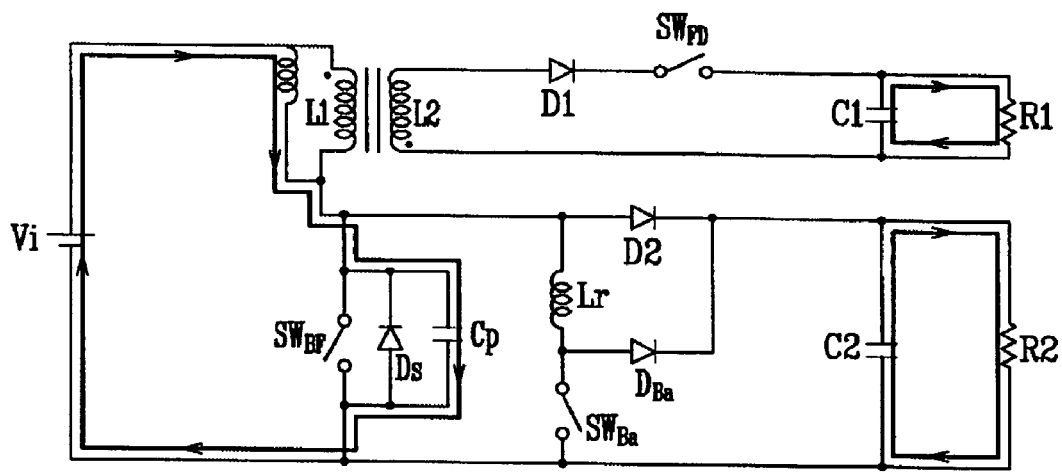

As shown in FIG. 5E, at the time t4, since the state of the signal $S_{BF}$ applied to the switching element $SW_{BF}$ is changed from the high level into the low level and thereby the switching element $SW_{BF}$ is turned off, the current flowing through the turned-on switching element $SW_{BF}$ via the primary coil L1 of the transformer TM flows toward the capacitor Cp, to charge the capacitor.

In addition, at the time t4, the state of the signal $S_{FD}$ applied to the switching element $SW_{FD}$ is changed from the low level into the high level and thereby the switching element $SW_{FD}$ is turned on. However, since the voltage induced at the secondary coil L2 of the transformer TM is smaller than that of the output voltage Vo1 of the flyback converter 911, the induced voltage is not applied to the output terminal of the flyback converter 911. By the operation of the transformer TM, the current $i_{Lm}$ flowing through the primary coil L1 reduces to a zero current state as shown by curve (e) in FIG. 4.

Thus, the charges stored in the capacitors C1 and C2 are discharged through the output terminals of the flyback converter 911 and the boost converter 912, respectively, and thereby the currents corresponding to the discharged charges flow through the loads R1 and R2, respectively.

By the turning-off of the switching element $SW_{BF}$, the voltage $V_{BF}$ and the current $i_{BF}$ of the switching element $SW_{BF}$ change to opposite states of each other, as shown by curves (f) and (g) in FIG. 4. In addition, since the current does not flow through the inductor Lr (refer to curve (i) in FIG. 4), the voltage $V_{Ba}$ applied across the switching element $SW_{Ba}$ and the current $i_{Ba}$ flowing through the switching element $SW_{Ba}$ are at a zero volt and zero current state, as shown by curves (j) and (h) in FIG. 4. At this time, the voltage $V_{Ba}$ is gradually increased to a target voltage by the operation of the inductor Lr.

Mode 6 (t5-t6)

At this time t5, since only the switching element $SW_{FB}$ is turned on (refer to FIG. 5F) and the voltage induced at the secondary coil L2 of the transformer TM is higher than the voltage Vo1, the flyback converter 911 outputs the output voltage Vo1 of a predetermined voltage magnitude. Thus, a current flows through the load R1 connected to the flyback converter 911 through the closed loop shown in FIG. 5F.

Meanwhile, the voltage corresponding to the discharged charges from the capacitor C2 is continuously applied to the load R2 connected to the output terminals of the boost converter 912.

By the above operations, the current $i_{Lm}$, the voltage $V_{BF}$ and the current $i_{BF}$ of the switching element $SW_{BF}$, the current $i_{Ba}$ of the switching element $SW_{Ba}$, and the current $i_{Lr}$ of the inductor Lr maintain the states shown by curves (e) and (i) in FIG. 4. In addition, the voltage $V_{Ba}$ that started to increases at time t4 is no longer increasing (refer to curve (j) of FIG. 4).

Mode 7 (t6-t7)

At the time t6 (refer to FIG. 5G), since the switching element $SW_{FD}$ is turned off and a magnetizing current generated by the magnetizing of the primary coil L1 of the transformer TM is applied toward the switching element $SW_{BF}$. However, since the switching element $SW_{BF}$ is turned off the magnetizing current is applied to the parasitic capacitor Cp. Thus, the voltage applied across the switching element $SW_{BF}$ is increased to reach the target voltage such as about 12V of the boost converter (refer to curve (f) in FIG. 4).

As shown by curve (j) in FIG. 4, the voltage applied across the switching element $SW_{Ba}$ is gradually increased by the oscillating of the inductor Lr and a parasitic capacitor (not shown) of the switching element $SW_{Ba}$, to reach the target voltage.

Mode 8 (t7-t8)

Figure 5H:
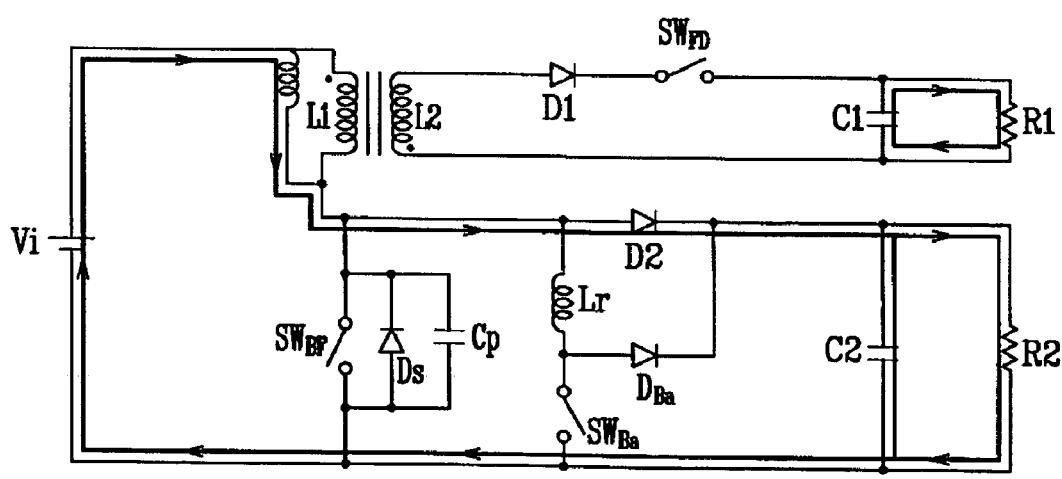

At the time t7 (refer to FIG. 5H), since the voltage $V_{BF}$ applied across the switching element $SW_{BF}$ is increased to the target voltage Vo2 of the boost converter 912, the diode D2 is turned on and thereby the current $i_{Lm}$ flowing through the primary coil L1 of the transformer TM flows through the load R2 via the diode D2. That is, a voltage Vo2 of about 12V is outputted from the output terminals of the boost converter 912 and is applied to the load R2, i.e., the cooling fan 930. However, since the charges stored in the output capacitor C1 are discharged through the load R1, the closed loop as shown in FIG. 5H is formed at the output terminals of flyback converter 911.

A voltage Vpri shown by curve (d) in FIG. 4 is a voltage applied across the primary coil L1 of the transformer TM.

According to the present invention, using one DC-DC converter including one transformer having a pair of coils, a plurality of DC voltages is obtained. Thus, the volume and weight of the DC-DC converter are decreased and thereby the design efficiency of the DC-DC converter is improved. In addition, manufacturing cost is decreased.

Since using the transformer is less influenced by electronic noise and has a high output efficiency, the DC voltages are obtained, and the voltage efficiency is improved.

Since a zero voltage and a zero current are archived by the operations of an inductor, a switching element, and a diode, the switching loss is decreased.

According to the present invention, when the main switching element and the main diode are turned on or off, a zero voltage switching state or a zero current switching state comes about by the operations of the auxiliary switching element of the majority of carrier semiconductor elements to decrease the switching loss of the switching elements.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A DC-DC converter comprising:
 a transformer including a primary coil and a secondary coil;
 a boost converter connected to the primary coil of the transformer and generating a first voltage; and
 a flyback converter connected to the secondary coil of the transformer and generating a second voltage.

2. The DC-DC converter of claim 1, wherein the boost converter comprises a first switching element connected to the primary coil of the transformer, an inductor connected in series with the first switching element, and a second switching element connectable in series with the inductor and the first switching element, and a capacitor.

3. The DC-DC converter of claim 2, wherein the first switching element is a MOSFET (metal oxide silicon field effect transistor).

4. The DC-DC converter of claim 2, wherein the second switching element is a MOSFET.

5. The DC-DC converter of claim 2, wherein the boost converter further comprises a synchronous rectifier in series with the capacitor.

6. The DC-DC converter of claim 1, wherein the flyback converter comprises a diode connected to the secondary coil of the transformer, a switching element connected to the diode, and a capacitor connected to the diode and the secondary coil.

7. The DC-DC converter of claim 6, wherein the switching element is a synchronous rectifier.

8. A driving apparatus comprising:
 a transformer including a primary coil and a secondary coil;
 a boost converter connected to the primary coil of the transformer and generating a first output voltage;
 a flyback converter connected to the secondary coil of the transformer and generating a second output voltage;
 a first load supplied to the first output voltage; and
 a second load supplied to the second output voltage.

9. The driving apparatus of claim 8, wherein the boost converter comprises a first switching element connected to the primary coil of the transformer, an inductor connected in series with said first switching element, and a second switching element connectable in series with the inductor and the first switching element, and a capacitor.

10. The driving apparatus of claim 8, wherein the first switching element is a MOSFET (metal oxide silicon field effect transistor).

11. The driving apparatus of claim 8, wherein the second switching element is a MOSFET.

12. The driving apparatus of claim 8, further comprising a synchronous rectifier in series with said capacitor.

13. A driving apparatus for a display device including a plurality of pixels, the apparatus comprising:
 a voltage generator generating first and second output voltages;
 a first load supplied with the first output voltage from the voltage generator; and
 a second load supplied with the second output voltage from the voltage generator,
 wherein the voltage generator comprises a transformer including a primary coil and a secondary coil, a first voltage generator connected to the primary coil of the transformer and generating the first output voltage, and a second voltage generator connected to the secondary coil of the transformer and generating the second output voltage.

14. The driving apparatus of claim 13, wherein the first voltage generator is a boost converter.

15. The driving apparatus of claim 14, wherein the first voltage generator comprises a first switching element connectable in series with the primary coil of the transformer, an inductor in series with said first switching element, a second switching element connected to the, primary coil of the transformer, and a capacitor connectable in parallel with said inductor and the first switching element, the first output voltage being produced across the capacitor.

16. The driving apparatus of claim 13, wherein the second voltage generator is a flyback converter.

17. The driving apparatus of claim 16, wherein the second converter comprises a diode connected to the secondary coil of the transformer, a switching element connected to the diode, and a capacitor connected to the diode and the secondary coil.

18. The driving apparatus of claim 13, wherein the first load is a cooling fan.

19. The driving apparatus of claim 13, wherein the second load is a microcomputer.

* * * * *